(12) United States Patent
Randazzo et al.

(10) Patent No.: US 8,170,972 B2
(45) Date of Patent: May 1, 2012

(54) CONFLICTING RULE RESOLUTION SYSTEM

(75) Inventors: Michael Thomas Randazzo, South Jordan, UT (US); Randy Kent Secrist, West Jordan, UT (US); David John Steiner, Kaysville, UT (US)

(73) Assignee: General Electric Company, Schenectady, NY (US)

( * ) Notice: Subject to any disclaimer, the term of this patent is extended or adjusted under 35 U.S.C. 154(b) by 855 days.

(21) Appl. No.: 11/743,318

(22) Filed: May 2, 2007

(65) Prior Publication Data

US 2008/0275838 A1 Nov. 6, 2008

(51) Int. Cl.
G06F 17/00 (2006.01)
G06N 5/02 (2006.01)

(52) U.S. Cl. ............... 706/47; 706/45; 706/46; 706/52; 706/62

(58) Field of Classification Search ............... 706/8, 21, 706/45–48, 52, 59, 62, 924; 600/300, 301
See application file for complete search history.

(56) References Cited

U.S. PATENT DOCUMENTS

| | | | |
|---|---|---|---|
| 5,329,612 A | 7/1994 | Kakazu et al. | |
| 5,487,130 A * | 1/1996 | Ichimori et al. | 706/61 |
| 5,487,134 A | 1/1996 | Ballard | |
| 5,592,590 A | 1/1997 | Jolly | |
| 5,897,627 A | 4/1999 | Leivian et al. | |
| 5,943,667 A | 8/1999 | Aggarwal et al. | |
| 6,484,171 B1 | 11/2002 | Corl, Jr. et al. | |
| 6,934,696 B1 | 8/2005 | Williams et al. | |
| 7,027,446 B2 | 4/2006 | Rosenfeld et al. | |
| 7,152,075 B2 * | 12/2006 | Vining et al. | 707/104.1 |
| 7,315,825 B2 * | 1/2008 | Rosenfeld et al. | 705/2 |
| 2002/0188465 A1* | 12/2002 | Gogolak et al. | 705/2 |
| 2003/0074439 A1* | 4/2003 | Grabarnik et al. | 709/224 |
| 2003/0120663 A1 | 6/2003 | Vining et al. | |
| 2006/0271408 A1* | 11/2006 | Rosenfeld et al. | 705/3 |
| 2007/0094227 A1* | 4/2007 | Randazzo et al. | 706/59 |
| 2007/0112827 A1* | 5/2007 | Dettinger et al. | 707/102 |
| 2007/0112853 A1* | 5/2007 | Dettinger et al. | 707/104.1 |
| 2007/0250460 A1* | 10/2007 | Armstrong et al. | 706/11 |

* cited by examiner

*Primary Examiner* — Omar Fernandez Rivas

(74) *Attorney, Agent, or Firm* — Hanley, Flight & Zimmerman, LLC

(57) ABSTRACT

A method for identifying conflicting and duplicate rules in a decision support system is provided. The method includes establishing a first subsystem including a protocol of existing rules, each existing rule includes an input feature. The method also includes creating a new rule that includes an input feature, and comparing terminology in the input feature of the new rule against terminology in the input feature of each existing rule of the protocol using a second subsystem and determining whether the new rule and at least one existing rule from the protocol are similar.

19 Claims, 4 Drawing Sheets

CONFLICTING RULE RESOLUTION SYSTEM

BACKGROUND OF THE INVENTION

This invention relates generally to decision support system rules and, more particularly, to methods and systems for identifying conflicting and duplicate rules.

Generally, decision support systems are computerized systems used for making decisions. Known decision support systems include a series of rules designed to aid the decision process. Over time, staff responsible for generating, writing and implementing the rules may change. Their replacements may enhance the decision support system by implementing new rules. However, new rules may conflict with or duplicate existing rules.

Consequently, decision support systems may end up with several rules processing the same information and returning conflicting or the same results. For example, in the health care industry context, a physician may generate a first rule recommending one course of treatment while another physician may create a second rule recommending a conflicting course of treatment—for the same ailment. One user of the decision support system may administer care to a patient based on the first rule, while another system user may administer care to the same patient based on the second rule. Thus, conflicting or duplicative rules may result in health care mistakes and related increased liability for health care providers.

BRIEF DESCRIPTION OF THE INVENTION

In one aspect, a method for identifying conflicting and duplicate rules in a decision support system is provided. The method includes establishing a first subsystem including a protocol of existing rules, each existing rule includes an input feature. The method also includes creating a new rule that includes an input feature and comparing terminology in the input feature of the new rule against terminology in the input feature of each existing rule of the protocol using a second subsystem and determining whether the new rule and at least one existing rule from the protocol are similar.

In another aspect, a system for identifying conflicting and duplicate rules in a decision support system is disclosed. The system includes a first subsystem configured to include a protocol that includes at least one existing rule, the at least one existing rule includes an input feature and a health care instruction. The system also includes a new rule including an input feature and a health care instruction and a second subsystem configured to identify and compare terminology in the new rule input feature against terminology in the at least one existing rule input feature and determine whether the new rule and the at least one existing rule are similar.

In yet another aspect, an apparatus is disclosed including a computer system including a first subsystem and a second subsystem. The first subsystem includes a protocol that includes at least one existing rule, the at least one existing rule includes an input feature and a health care instruction and the second subsystem is configured to identify and compare terminology in a new rule against terminology in the at least one existing rule and determine whether the new rule is similar to the at least one rule.

DETAILED DESCRIPTION OF THE INVENTION

Figure 1:
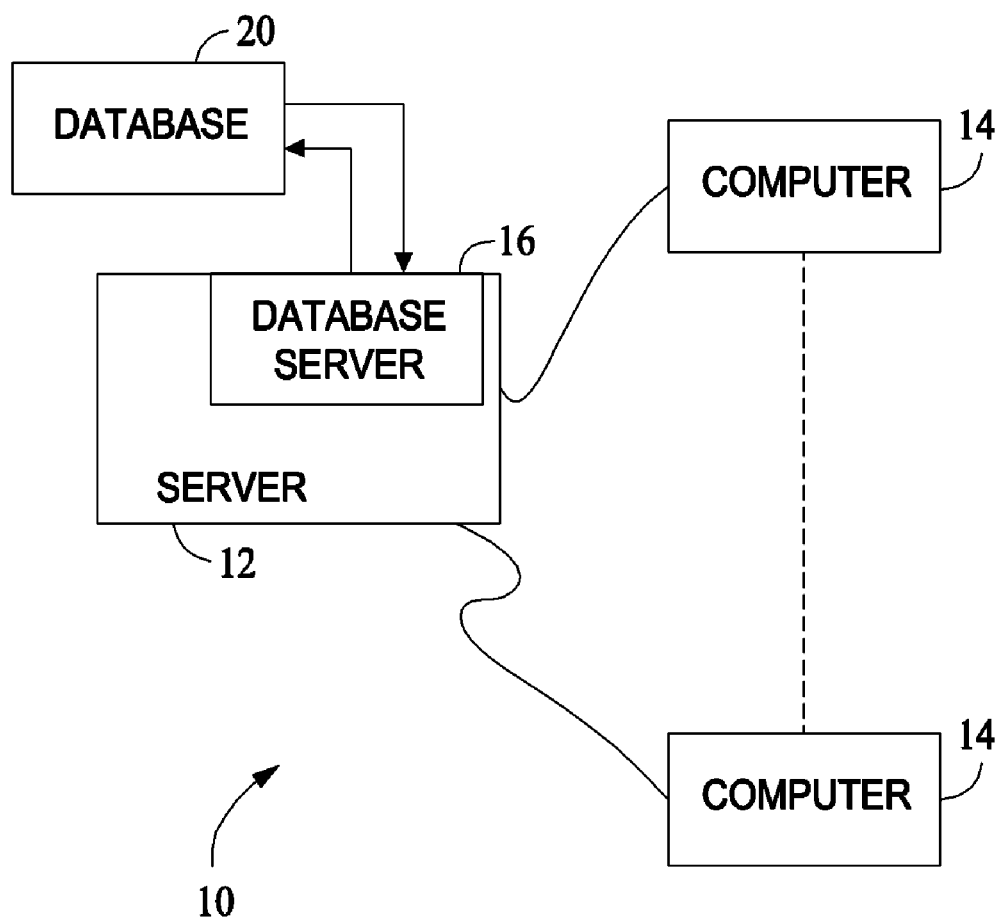
FIG. 1 is a simplified block diagram of a decision support system in accordance with one embodiment of the present invention.

The methods and systems described herein facilitate coordinating decision support system rules to minimize conflicts and duplication between rules. The methods and systems described herein are believed to be applicable to many different businesses for reducing decision support system mistakes due to rule conflicts and duplication. The example embodiment described herein is the medical business. Although the medical business is the example business described herein, the invention is in no way limited to the medical business.

Exemplary embodiments of systems and processes that facilitate integrated network-based electronic verification of proper decision support system rule coordination are described below in detail. The systems and processes facilitate, for example, removing conflicting and duplicative rules using a CRR (Conflicting Rule Resolution) system. A technical effect of the systems and processes described herein include at least one of permitting an entity to identify and report conflicts and duplications between rules. More specifically, in the example embodiment, a hospital or other entity that is engaged in the business of providing health care services to patients, utilizes the methods and systems of the example embodiment to identify and report rule conflicts and duplications so that decision support system errors are reduced.

In the exemplary embodiment, the CRR system is utilized to identify and display possible rule conflicts and duplications. At least some of the parties that may be involved in these systems and processes include medical care facilities, system administrators, health care professionals and patients. Medical care facilities provide medical services to patients. The system administrator refers to the individuals who maintain the decision support system. Health care professionals refers to those individuals involved in administrating care to patients, such as, but not limited to, physicians, nurses, clinicians and pharmacists. Health care professionals create and implement the decision support system rules. Moreover, health care professionals provide medical services based on the results of the decision support system rules. Patients are the individuals requiring medical care.

In the example embodiment, users of the CRR system are able to perform many tasks, such as, but not limited to, identifying and displaying possible rule conflicts and duplication, cancelling or modifying new rules, and deactivating existing rules. In the example embodiment, the CRR system includes a first subsystem and a second subsystem.

The first subsystem defines a protocol which is a set of health care instructions or rules established by health care professionals. More specifically, the protocol includes rules relating to a wide variety of maladies, such as, but not limited to, heart disease, diabetes, cancer and broken bones that are generally treated at a medical facility, such as a hospital.

Rules are mapped with an input and an output feature where the input feature relates to the malady and the output feature corresponds to the instruction or treatment dictated by the rule. More specifically, rule configuration files are written detailing inputs and outputs for each rule. The input constitutes data that is entered into the CRR system and prompts activating a rule. Thus, each rule relies on a certain type of data, or input, that is being processed through the CRR system. The CRR system automatically links the input with the corresponding rule or rules. For example, for a heart attack patient, the input data may be heart rate readings determined by an electrocardiogram. The CRR system automatically links the input data with at least one rule corresponding to heart rate readings and generates a corresponding output, or treatment to be administered.

Each rule is written by a health care professional and is designed to generate an output, or outcome, such as, but not limited to, notification that a patient isn't responding well to medication, a method of treatment, suggested drug dosages, and notifications that a patient is not to receive certain medications. Rules may include instructions for administering a variety of medical therapies corresponding to various of maladies. For example, rules for heart disease may include instructing a health care professional to administer a blood thinning drug such as cumadin or heprin, and a dosage such as once daily or several times daily. Rules for diabetes may recommend increasing or decreasing insulin injections. Rules for cancer may recommend monitoring progress, such as for prostate cancer, or may recommend immediate surgery. Rules for treating broken bones may include instructing a health care professional to apply a cast or perform surgery to repair a bone. It should be appreciated that health care protocols may include any number of rules or instructions, relating to any kind of malady, that enables the CRR system to function as described herein.

The second subsystem is a known business software application used for identifying terminology in text. It should be appreciated that other embodiments may use any software application capable of identifying terminology as described herein. Further, it should be appreciated that although the example embodiment describes the second subsystem as a terminology identifying software application, other embodiments may include any software application representing any aspect of health care as the second subsystem. For example, the second subsystem may also be a software application for admitting patients or for altering collection policies.

It should be appreciated that although the example discussed above is from the medical business, the CRR system may be used in any other business or field of endeavor involving decision support systems. However, it should be further appreciated that other businesses or organizations may define a different set of rules that are tailored to the particular business, and that for each business, rule conflict and rule duplication definitions will be different.

In one embodiment, a computer program is provided, and the program is embodied on a computer readable medium and utilizes a Structured Query Language (SQL) with a user interface for administration and an interface for standard input and generating reports. In an exemplary embodiment, the system is run on a business-entity intranet. In a further exemplary embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independently and separately from other components and processes described herein. Each component and process also can be used in combination with other assembly packages and processes.

FIG. 1 is a simplified block diagram of a Conflicting Rule Resolution (CRR) system 10 including a server system 12, and a plurality of client sub-systems, also referred to as client systems 14, connected to server system 12. Computerized modeling and grouping tools, as described below in more detail, are stored in server 12 and can be accessed by a requester at any one of computers 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
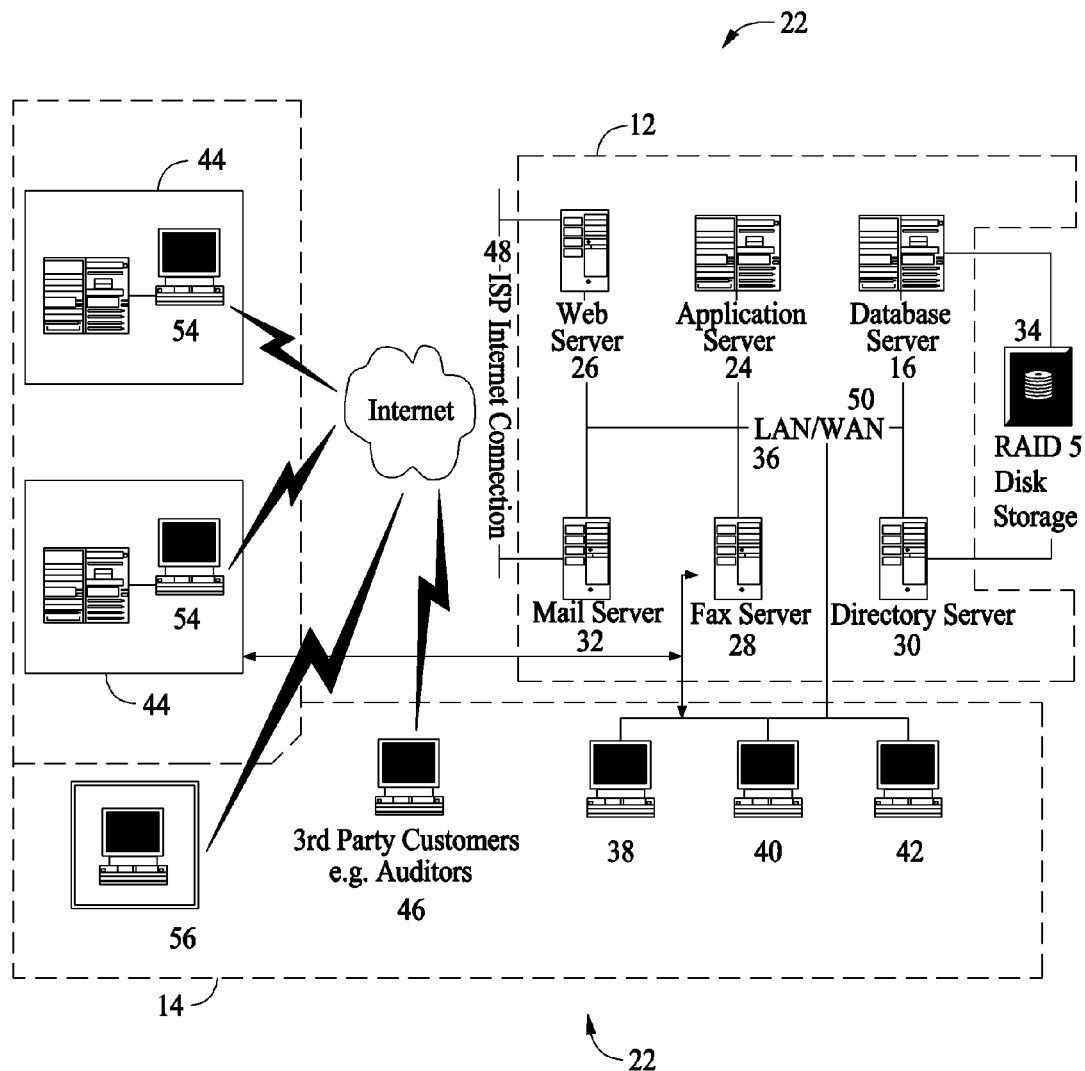
FIG. 2 is an expanded version block diagram of an example embodiment of a server architecture of the decision support system.

FIG. 2 is an expanded block diagram of an exemplary embodiment of a server architecture of a CRR system 22. Components in CRR system 22, identical to components of system 10 (shown in FIG. 1), are identified in FIG. 2 using the same reference numerals as used in FIG. 1. CRR System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., clients/customers 46, using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access CRR system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Figure 3:
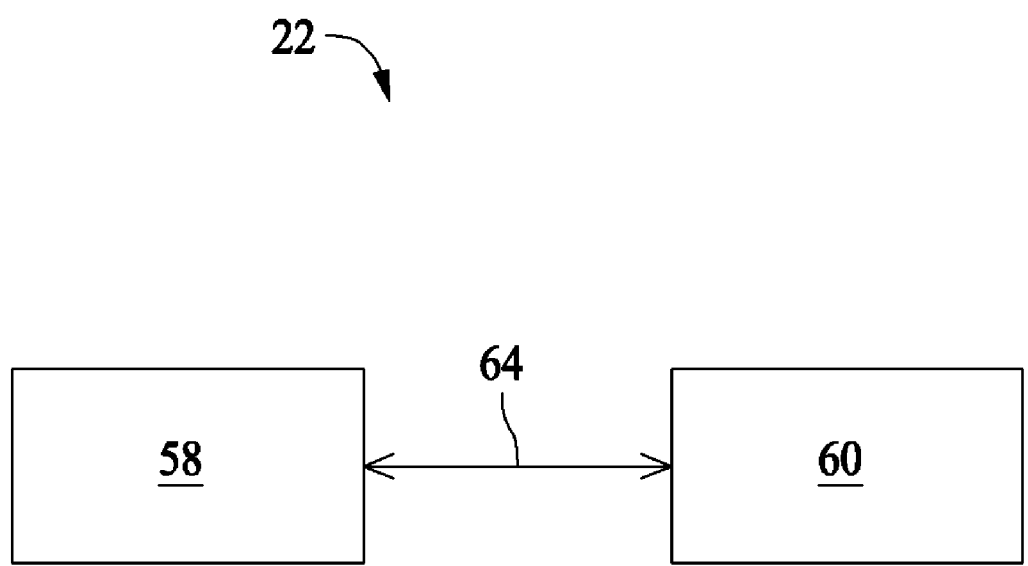
FIG. 3 is a schematic block diagram showing communication between subsystems.

FIG. 3 is a schematic block diagram illustrating the two subsystems of the exemplary embodiment. More specifically, CRR system 22 (shown in FIG. 2) includes a first subsystem 58 and a second subsystem 60. Subsystem 58 is CRR system 22 protocol, and subsystem 60 is CRR system 22 terminology subsystem. Subsystems 58 and 60 communicate over a communications link 64. Information may flow from first subsystem 58 to second subsystem 60 and from second subsystem 60 to first subsystem 58. It should be appreciated that subsystems 58 and 60 are stored on database 20 (shown in FIG. 2). The software application that provides link 64 ties subsystems 58 and 60 together to form CRR system 22.

Figure 4:
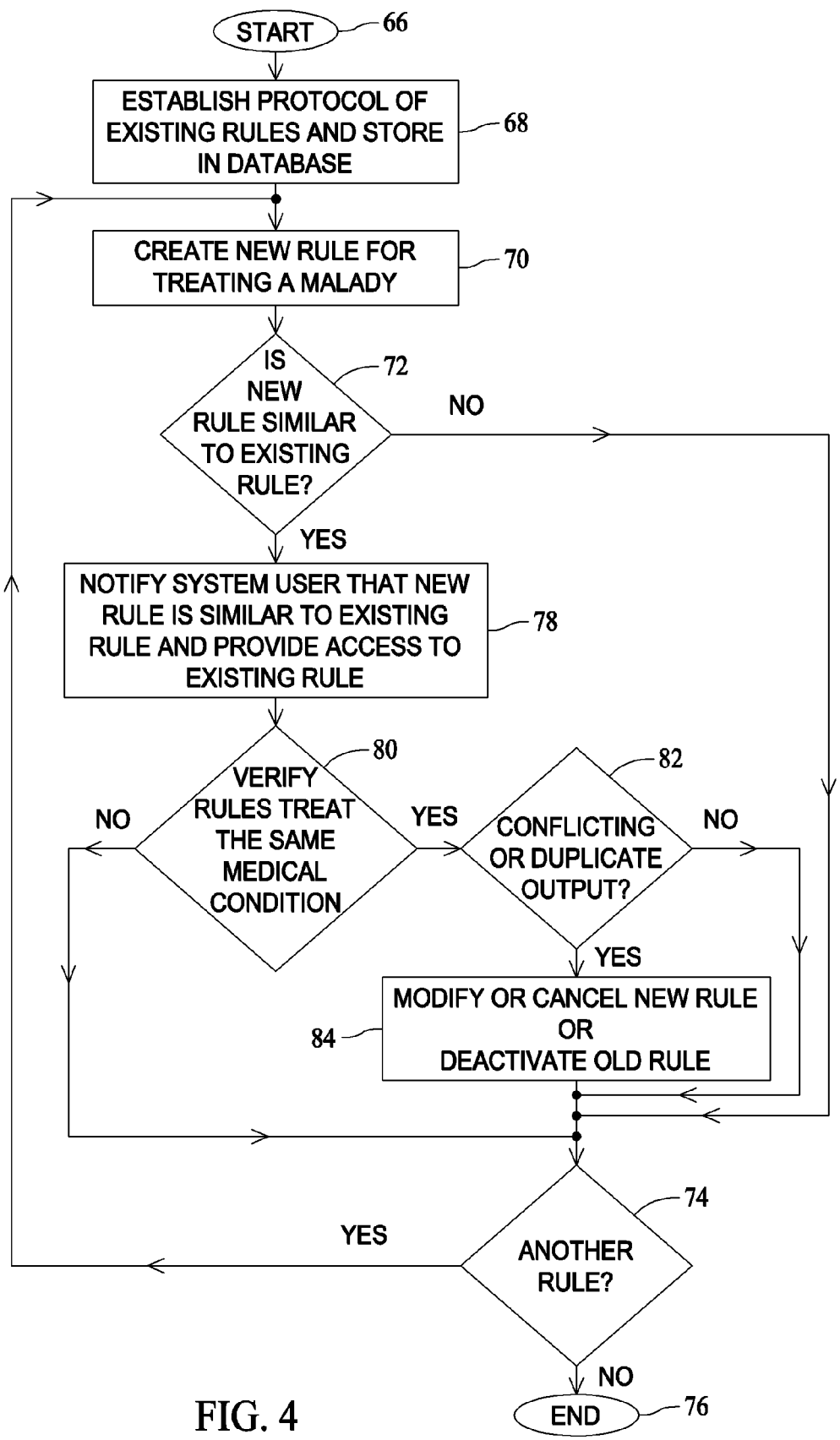
FIG. 4 is a flowchart illustrating exemplary processes utilizing a CRR system.

FIG. 4 is a flowchart illustrating exemplary processes used by CRR system 22 (shown in FIG. 2) for determining whether a new rule conflicts with or duplicates an existing rule. For CRR system 22, determination starts 66 by establishing a protocol of existing rules 68 and storing the protocol on database 20 (shown in FIG. 2). A health care professional, using CRR system 22, creates a new rule 70 for treating any malady.

In the exemplary embodiment, the newly created rule is compared 72 against the protocol to determine whether the new rule is similar to any of the existing rules in the protocol. Each newly created rule is written using a template for returning objects and is coupled to the terminology subsystem stored on database 20. The terminology subsystem compares inputs and outputs of the new rule against inputs and outputs of existing rules, respectively, to determine whether there is a similarity between the new rule and the existing rules. For example, the terminology system may compare the following existing and new rules:

An existing rule has two inputs and a single output, as follows:
Ex. Rule Input 1: \lab\creatinine Ex. Rule Input 2: \vital\daily weight Ex. Rule Output: \return\creatinine clearance
A new rule has two inputs and a single output, as follows:
New Input 1: \lab\creatinine New Input 2: \vital\admit weight
New Output: \return\crCL The terminology subsystem compares the first inputs, the second inputs and the outputs of the existing rule and the new rule, respectively, against each other. Based on these comparisons, the terminology subsystem identifies the exact match of the first inputs, identifies the inputs "admit weight" and "daily weight" as weights, and identifies "creatinine clearance" and "crCL" as two ways of expressing the same thing. These types of common information determine that the new rule is very similar to the existing rule and should be checked. Consequently, if the new rule is determined to be similar to at least one existing rule, an alert or notification is sent to the user. Otherwise, the user decides 74 whether to create another rule 70 or end operation 76.

The system user may be notified of a similarity in many ways, such as, but not limited to, displaying the notification 78 and similar existing rules on a computer monitor or in an e-mail. Upon receiving the notification, the user is provided access to the similar existing rules and compares 80 the inputs and outputs of the similar existing rules against the new rule to verify that the new rule is designed to provide treatments for the same medical condition as the similar existing rules. If the rules are not designed to treat the same medical condition, the user decides 74 whether to create another rule 70 or end operation 76.

More specifically, while comparing the new rule against the similar existing rules the user is able to pass sample input data through each to determine their respective outputs. Doing so, permits comparing 82 the output from the new rule against the output from the similar existing rules to determine whether the rules generate duplicate or conflicting output for the same input data. If the output of the new rule conflicts with or duplicates the output of the at least one similar existing rule 82, the new rule may be modified 84 to eliminate the output conflict or cancelled 84 to eliminate the output duplication. Additionally, the at least one similar existing rule may be deactivated 84. The user decides which to do based upon case specific information determined or obtained during the comparison. For example, while making the comparison, the user may discover that the at least one similar existing rule is based on outdated information and should be updated to the new rule. In such a case, the user deactivates 84 the at least one similar existing rule. If the output of the new rule does not conflict with or duplicate the output of the at least one similar existing rule 82, the user decides 74 whether to create another rule 70 or to end operation 76.

In the example embodiment, an interface records and tracks rules generated for a decision support system. More specifically, a method for reducing decision support system rule conflicts and duplications is provided where a user does not compare a new rule against every existing rule to validate a new rule. The configuration file of each new rule is compared against the configuration files of existing rules to determine similar existing rules, and the user determines whether there is a match between the new rule and the similar existing rules. As a result, duplicate notifications, or alerts, are not sent to users and duplicate rules that generate different results will not be sent to a user. Consequently, medical facilities will provide a higher quality of medical care and reduce exposure to medical malpractice liability.

While the invention has been described in terms of various specific embodiments, the description of the various embodiments is illustrative only and is not to be construed as limiting the invention. Various other modifications and changes may occur to those skilled in the art without departing from the spirit and scope of the invention.

What is claimed is:

1. A method for identifying conflicting and duplicate rules in a decision support system, said method comprising:
    establishing a first subsystem comprising a protocol of existing rules, each existing rule comprises an input feature;
    creating a new rule comprising an input feature and a health care treatment instruction, wherein the input feature of the new rule is not identical to the input feature of any of the existing rules;
    comparing terminology in the input feature of the new rule with terminology in the input feature of each existing rule of the protocol using a second subsystem;
    determining that the new rule and at least one existing rule from the protocol are similar as a function of said comparison, wherein determining further comprises passing sample input data through the new rule and the at least one existing rule to determine a respective output of each rule and comparing the output of each rule to determine a duplicate or conflicting output for the same input data;
    notifying a user that the new rule and the at least one existing rule are similar; and
    prompting the user to resolve the similarity, wherein the user is given an option to cancel the new rule.

2. A method in accordance with claim 1 further comprising comparing an output of the new rule to an output of the at least one existing rule and determining whether the outputs are duplicate or conflicting.

3. A method in accordance with claim 1 wherein the user is also prompted to modify the new rule or deactivate the at least one existing rule.

4. A method in accordance with claim 1 further comprising verifying that the new rule and the at least one existing rule treat the same medical condition.

5. A method in accordance with claim 1 further comprising including an output feature in the new rule wherein the output feature is an outcome generated by the new rule.

6. A method in accordance with claim 5 further comprising defining the outcome as at least one of a notification that a patient is not responding well to medication, a method of treatment, a suggested drug dosage and a notification that a patient is not to receive medications.

7. A method in accordance with claim 1 further comprising inputting data into the decision support system to activate at least one existing rule of the protocol of rules.

8. A system for identifying conflicting and duplicate rules in a decision support system, said system comprising:
a first subsystem configured to comprise a protocol comprising at least one existing rule, said at least one existing rule comprises an input feature; and
a second subsystem configured to:
compare terminology in an input feature of a new rule with terminology in said input feature of said at least one existing rule;
determine that said new rule and said at least one existing rule are similar as a function of the comparison, wherein determining further comprises passing sample input data through the new rule and the at least one existing rule to determine a respective output of each rule and comparing the output of each rule to determine a duplicate or conflicting output for the same input data;
notify a user that said new rule and said at least one existing rule are similar; and
prompt the user to resolve the similarity, wherein the user is given an option to cancel said new rule.

9. A system in accordance with claim 8 wherein said system is configured to compare an output of said new rule to an output of said at least one existing rule to determine whether said outputs are duplicates or are conflicting.

10. A system in accordance with claim 8 wherein said system is configured to prompt a user to verify that said new rule and said at least one existing rule treat the same medical condition.

11. A system in accordance with claim 8 wherein said system is configured to activate said at least one existing rule using data input into said decision support system.

12. A system in accordance with claim 8 wherein said system is configured to generate an outcome for said new rule and said at least one existing rule comprising at least one of a notification that a patient is not responding well to medication, a method of treatment, a suggested drug dosage and a notification that a patient is not to receive a medication.

13. An apparatus comprising:
a computer system comprising a first subsystem and a second subsystem;
said first subsystem comprising a protocol comprising at least one existing rule, said at least one existing rule comprises an input feature and a health care instruction; and
said second subsystem configured to:
compare terminology in a new rule with terminology in said at least one existing rule, wherein the terminology in said new rule is not identical to the terminology in said at least one existing rule;
determine that said new rule is similar to said at least one existing rule as a function of the comparison, wherein determining further comprises passing sample input data through the new rule and the at least one existing rule to determine a respective output of each rule and comparing the output of each rule to determine a duplicate or conflicting output for the same input data;
notify a user that said new rule and said at least one existing rule are similar; and
prompt the user to resolve the similarity, wherein the user is given an option to cancel said new rule.

14. An apparatus in accordance with claim 13 wherein an output of said new rule is compared to an output of said at least one existing rule to determine whether said outputs are duplicate or are conflicting.

15. An apparatus in accordance with claim 13 wherein said at least one existing rule is activated by data input into said decision support system.

16. An apparatus in accordance with claim 13 wherein the user verifies that said new rule and said at least one existing rule treat the same medical condition.

17. An apparatus comprising:
a computer system comprising a first subsystem comprising a protocol comprising at least one existing rule and a second subsystem configured to:
compare an output of said at least one existing rule to an output of a new rule similar to said at least one existing rule;
determine whether said outputs are duplicate or are conflicting, wherein determining further comprises passing sample input data through the new rule and the at least one existing rule to determine a respective output of each rule and comparing the output of each rule to determine a duplicate or conflicting output for the same input data;
notify a user that said new rule and said at least one existing rule are similar; and
prompt the user to resolve the similarity, wherein the user is given an option to cancel said new rule.

18. An apparatus in accordance with claim 17 wherein said at least one existing rule is activated by data input into a decision support system.

19. An apparatus in accordance with claim 17 wherein the user verifies that said new rule and said at least one existing rule treat the same medical condition.

\* \* \* \* \*